Jan. 21, 1958 — R. JAMES, JR — 2,820,702

CATALYST-SUPPORTING DRAIN FOR CATALYTIC REACTANTS

Filed Oct. 31, 1955 — 2 Sheets-Sheet 1

INVENTOR.
Ralph James, Jr.,
BY
ATTORNEY.

Jan. 21, 1958   R. JAMES, JR   2,820,702
CATALYST-SUPPORTING DRAIN FOR CATALYTIC REACTANTS
Filed Oct. 31, 1955   2 Sheets-Sheet 2
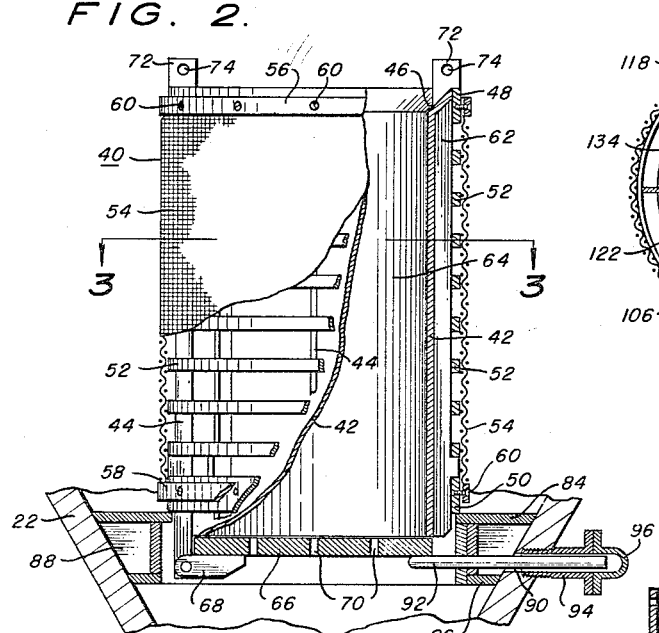
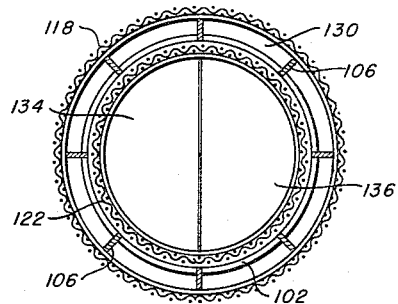
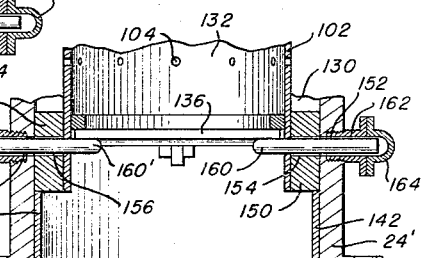
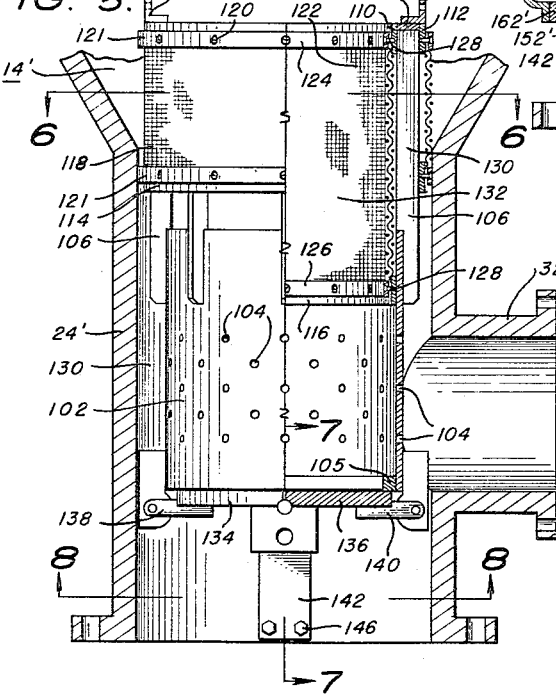
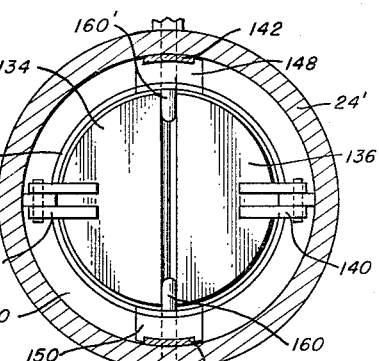
INVENTOR.
Ralph James, Jr.,
BY
ATTORNEY.

United States Patent Office 2,820,702
Patented Jan. 21, 1958

2,820,702

CATALYST-SUPPORTING DRAIN FOR CATALYTIC REACTANTS

Ralph James, Jr., Channelview, Tex., assignor, by mesne assignments, to Esso Research and Engineering Company, Elizabeth, N. J., a corporation of Delaware Application October 31, 1955, Serial No. 543,717

5 Claims. (Cl. 23—288)

This invention relates to a catalyst-supporting drain. More particularly, this invention relates to the provision, in a reactor containing a finely divided catalyst, of a catalyst supporting drain of a construction such that the pressure drop in the reactor is compensated for and such that catalyst supported thereby may be removed therethrough.

The provision of drains for reactors adapted for the treatment of fluent materials with a finely divided catalyst presents a serious problem in that such drains must provide an effective support for the catalysts in the reactor and also compensate for the pressure drop that will exist therein due to the flow of fluent reactants therethrough. Frequently, a pressure drop of as much as 100 to 300 pounds per square inch must be compensated for in addition to the weight of the catalyst. It is preferable that the drain be of a construction such that the catalyst may be withdrawn therethrough for replacement and/or rejuvenation from time to time.

An object of the present invention is the provision of a catalyst-supporting drain for a reactor adapted to contain a finely divided catalyst.

Another object is the provision of a drain for a catalytic reactor; such drain being constructed to support a finely divided catalyst contained in the reactor, to compensate for a pressure drop existing in the reactor during catalyst treating reactions and to permit periodic withdrawal of the catalyst therethrough.

A still further object of the present invention is the provision of a reactor containing a finely divided catalyst to be used for catalytically treating a fluent catalyst; such reactor having mounted therein a catalyst-supporting drain for the removal of catalytically treated fluent materials and for the periodic removal of the catalyst contained in the reactor.

These and other objects are attained, in general, through the provision of a catalyst-supporting drain comprising an upstanding, side wall perforated, rigidly supported drain annularly defining a drain port, and a rigid drain port door attached to the bottom of said drain for supporting a finely divided catalyst thereabove when in closed position.

The manner in which the above-enumerated and other objects are attained will be more readily apparent from the following description and the accompanying drawings wherein:

Fig. 2 is a fragmentary side elevational view, partly in section and with parts broken away showing in greater detail the catalyst-supporting drain of Fig. 1;

Fig. 5 is a fragmentary side elevational view, partly in section, showing another form of catalyst-supporting drain constructed in accordance with the present invention;

Fig. 6 is a cross-sectional view of the catalyst-supporting drain of Fig. 5 taken along the lines 6—6;

Fig. 7 is a fragmentary cross-sectional view of the bottom portion of the drain of Fig. 5 taken along the lines 7—7 of Fig. 6; and Fig. 8 is a cross-sectional view of the catalyst supporting drain of Fig. 6 taken along the lines 8—8.

Figure 1:
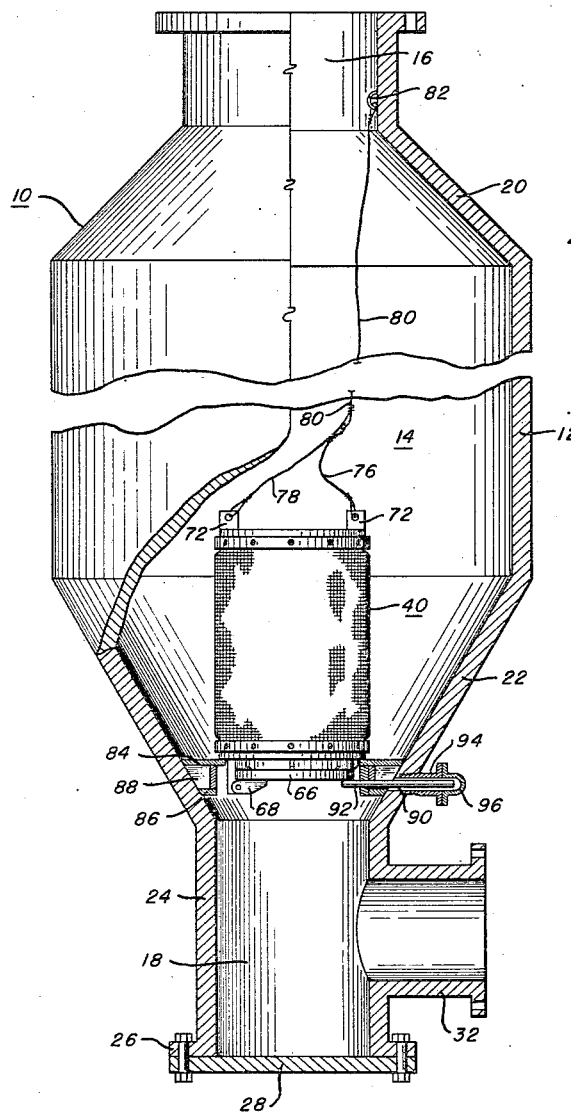
Fig. 1 is a side elevational view, partly in section, of a catalytic reactor having mounted therein one embodiment of a catalyst-supporting drain of the present invention.

Turning now to Fig. 1 there is shown a catalytic reactor comprising a wall 12 defining a catalyst chamber 14; the wall 12 also defining an upper inlet opening 16 and a lower outlet opening 18. The catalyst chamber 14 is preferably of a substantially larger diameter than the upper and lower openings 16 and 18 and is preferably provided with inwardly converging wall portions 20 and 22 converging to the openings 16 and 18.

The lower opening 18 preferably merges with a downwardly extending conduit 24 having a flange 26 at the bottom thereof to which is removably secured cover plate 28. With this construction a side delivery conduit 32 is preferably provided for the removal of treated fluent reactants. As a consequence, a finely divided catalyst contained within the catalyst chamber 14 may be removed through the conduit 24 when the cover plate 28 is removed.

Figure 3:
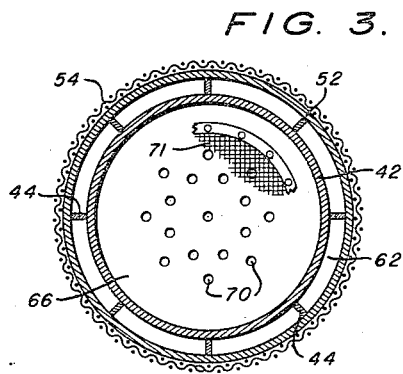
Fig. 3 is a cross-sectional view of the catalyst-supporting drain shown in Fig. 2 taken along the lines 3—3.
Figure 4:
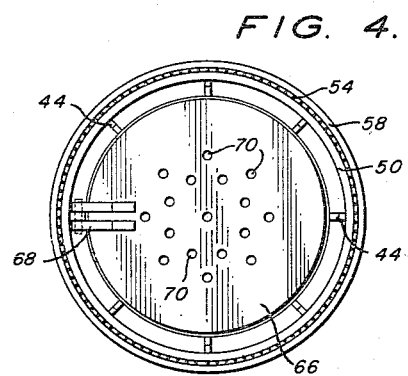
Fig. 4 is a bottom view of the catalyst-supporting drain of Fig. 2.

In accordance with the present invention there is provided a drain covering the outlet opening 18 such as a drain 40, the construction of which is more clearly shown in Figs. 2 to 4.

Turning now to Figs. 2 to 4 it will be seen that the drain 40 comprises an inner cylindrical sleeve 42 to the outside of which is secured a plurality of spaced supporting ribs 44. An outwardly flaring frustro-conical cover plate 46 is fixed to the top of the wall member 42 and the tops of the supporting ribs 44.

Upper and lower screened securing rings 48 and 50 are fixed to the supporting ribs 44 adjacent the tops and bottoms thereof and a plurality of spaced screen supporting rings 52 are fixed to the supporting ribs 44 intermediate the screen securing rings 48 and 50. A screen 54 of suitable mesh is wrapped around the rings 48, 50 and 52 (which rings 48, 50 and 52 may be considered openwork screen support means) and secured in place by means of upper and lower screen retaining rings 56 and 58, respectively; the screen 54 being secured through the provision of a plurality of retaining screws 60 extending through the screen retaining rings 56 and 58 and threaded into the screen securing rings 48 and 50. It will be understood that several layers of the screen 54 may be employed if desired, in order that the perforations (i. e., openings) therethrough may be of a suitable size to prevent the passage of catalyst particles therethrough and in order that the screen may be of sufficient rigidity. The rings 48, 50 and 52 and the screen 54 supported thereby may be considered as a perforate wall member in that the recited structure comprises a perforate barrier for the catalyst through which fluent materials may flow.

It will be seen that with this construction the inner wall member 42 and the rings 48, 50 and 52, together with the screen 54 define therebetween a drainage space 62 and a drain port 64; the drain port being defined by the inner surface of the sleeve 42.

In accordance with this embodiment of the invention a perforate catalyst supporting door 66 is secured to the bottom of the drain 40 by any suitable means such as a suitable hinge member 68. The door 66 is provided with a plurality of openings 70 and, if desired or necessary, is surfaced with a suitable screen 71 (as shown more clearly in Fig. 3) whereby there is provided perforations therein sufficiently small to retain a finely divided catalyst supported on the door 66.

With reference to Fig. 1 it will be seen that the drain 40 has a cross-sectional configuration equivalent to and less than the cross-sectional configuration of the opening 16 in the reactor 10. As a consequence, suitable means may be provided for withdrawing the drain 40 through the upper inlet opening 16. Thus, for example, there may be provided for this purpose a pair of upwardly extending ears 72 having openings 74 therein. Cables 76 and 78 may be fastened to the ears 72 and joined with a hoisting cable 80 fixed at the upper end thereof to a suitable eye 82 positioned adjacent the upper inlet 16.

Suitable means is also provided for mounting the drain 40 over the lower outlet opening 18 in the reactor 10. For this purpose there may be provided, for example, spaced upper and lower retaining rings 84 and 86 having a plurality of supporting webs 88 fixed therebetween. The rings 84 and 86 should have an inner diameter substantially equal to the diameter of the lower screen retaining ring 50 on the catalyst drain 40. As a consequence, when the drain 40 is positioned within the reactor 10, the lower screen retaining ring 50 will seat on the upper supporting ring 84.

There is also provided suitable means for releasably closing the drain port door 66; such means preferably being of a construction such that the door 66 may be opened from outside the reactor. Thus, for example, an opening 90 may be provided in the wall 12 and a latching rod 92 may be passed through the opening 90 for engagement with the drain port door 66 opposite the hinge 68. In order to prevent the escape of fluent material through the opening 90, there is preferably provided cover means therefor such as a flange pipe member 94 tapped into the hole 90 and a flanged bell member 96 fixed to the pipe 94.

*Operation*

In operation, and assuming that the catalyst chamber 14 (Fig. 1) is empty, the drain 40 is lowered into the catalyst chamber 14 through the upper inlet opening 16 by means of the cable 80 and seated upon the upper support ring 84. The cable 80 at its upper end is then fastened to the eye 82 adjacent the upper inlet opening 16. Care is taken to see that the drain port door 66 is properly latched by means of the latching rod 92 extending through the opening 90 in the wall of the shell 12.

After the drain 40 has been properly positioned, an appropriate amount of a suitable finely divided catalyst is deposited in the catalyst chamber 14 through the upper inlet opening 16. The catalyst will surround the screen 54 and will also be deposited in the drain port 64. After suitable operating conditions (temperature, pressure, etc.) have been established in the catalyst chamber 14, a fluent material (which may be a gas, a liquid, or a mixture of liquids and gases) is introduced into the reactor 10 through the upper inlet 16 for treatment by the finely divided catalyst (not shown) in the catalyst chamber 14. A major portion of the fluent material, after passage through the catalyst bed, will pass through the screen 54, through the spaces between the supporting ribs 44 and the supporting rings 52 into the drainage space 62. A minor portion of the fluent material will flow through that portion of the catalysts deposited in the drain port 64 and from thence through the openings 70 in the drain port door 66. The thus removed fluent material is withdrawn from the reactor 10 through the side delivery conduit 32. The pressure exerted by the fluent materials in the drain port 40 against the wall member 42 will be counterbalanced by the equivalent pressure of the fluent materials passing through the screen 54 into the drainage space 62. As a consequence, the pressure drop within the reactor 10 is effectively cancelled out so that the drain 40 need support only the weight of the catalyst deposited directly thereabove. This supporting function is primarily performed by the drain port door 66.

It is also possible to remove substantially all of a finely divided catalyst from the chamber 14 for replacement and/or rejuvenation without removing the drain 40. Thus, the flow of fluent material through the catalyst chamber 14 is discontinued and the cover plate 28 is removed from the bottom of the conduit 24. Next, the bell cover 96 is removed from the pipe 94 and the latching rod 92 is withdrawn through the opening 90 in the wall 12 of the reactor 10. As a consequence, the drain port door 66 will swing to an open position about the hinge 68 and finely divided catalysts will flow downwardly through the drain port 64 and out the conduit 24 to suitable receptacles (not shown). A portion of the catalyst intermediate the screen 54 and the wall 12 of the reactor 10 will not be able to flow through the drain port 64. However, after the major amount of the catalysts has been removed therefrom, it is an easy matter to raise the drain 40 by means of the cable 80 in order that this remaining portion of the catalyst may flow through the conduit 24 if this is so desired.

When it is desired to resume operations, the cover plate 28 is secured to the bottom of the conduit 24 and the drain 40 is positioned on the upper retaining ring 84 in the above-described manner. The drain 40, while removed from the catalyst chamber 14, may be inspected, repaired and, if necessary, replaced by a drain of similar construction.

*Modified catalyst-supporting drain*

A modified catalyst-supporting drain 100 which may also be used in accordance with the present invention is shown in Figs. 5 to 8. With reference to Figs. 5 to 8 it will be seen that the modified drain 100 comprises a cylindrical sleeve 102 having a plurality of perforations 104 in the side thereof and having a support ring 105 fixed to the bottom of the inner wall thereof. A plurality of support ribs 106 are fixed to the upper end of the sleeve 102 and extend upwardly therefrom. A cover ring 108 is fixed to the upper ends of the support ribs 106 and an inner upper screen support ring 110 and an outer upper support ring 112 are fixed thereto. A lower outer support ring 114 is fixed to the support ribs 106 intermediate the ends thereof in a manner to be described and an inner lower screen support ring 116 is fixed to the interior of the sleeve 102. A suitable outer screen member 118 is wrapped about the ribs 106 and secured to the outer support rings 112 and 114 by any suitable means such as of a plurality of retaining screws 120 passing through a retaining ring 121. An inner screen member 122 is secured to the inner support rings 110 and 116 by means of upper and lower screen retaining rings 124 and 126 by means of a plurality of retaining screws 128. The modified drain 100 is adapted to be seated in a conduit 24' comprising a lower outlet opening of a catalyst chamber 14' (only the lowermost portion of which is shown in Fig. 6). In accordance with this modification the sleeve 102 and the support ribs 106 are proportioned in a manner such that they will seat within the conduit 24' and in a manner such that the lower screen retaining ring 121 will provide a seal between the conduit 24' and the catalyst chamber 14'. As a consequence, substantially all of that portion of the drain 100 defined by the inner and outer screens 118 and 122 will extend upwardly into the catalyst chamber 14' and the remainder of the drain 100 will be positioned within the conduit 24'. It is to be noted that the support ribs 106 and the inner and outer screen members 118 and 122 define an annular drainage space 130 and that the inner screen member 118 and the inner surface of the sleeve 102 define a drain port 132. A suitable catalyst support door is fixed to the bottom of the sleeve 102. In the form of the invention shown in Figs. 5 to 7, the door comprises a pair of door members 134 and 136 hinged to opposite sides of the sleeve 102 by any suitable means such as through the provision of hinges 138 and 140. Suitable means are provided for supporting the drain 100 in the conduit 24'. Thus, for example, there may be provided a pair of bearing plates 142 fixed at the bottom of the conduit 24' in quadrature with respect to the hinges 136 and 138 by any suitable means such as through the provision of a plurality of bolts 146. Bearing plates 148 and 150 are fixed to the lower portion of the sleeve 102 and seat on the upper surfaces of the bearing plates 142.

Openings 152 and 152' are provided in the side of the conduit 24' and aligned openings 154 and 156 are also provided in the plates 148 and 150. As a consequence, latching rods 160 and 160' may be inserted through the openings 152 and 152' and thence through the openings 154 and 156 whereby the door members 134 and 146 may be secured in a closed position. In order to prevent fluent material from escaping through conduit 24' flanged pipe members 162 and 162' may be tapped into the side of the conduit 24' about the opening 152 and 152' and flanged bell covers 164 and 164' may be secured to the flanged cover pipes 162 and 162'. The latch rods 160 and 160' also act as safety catches for supporting the drain in the event of failure of the bolts due to corrosion or stress corrosion.

It will frequently happen that the inlet and outlet openings of a catalytic reactor will be of the same diameter, and when such is the case, a pair of flanges 170 and 172 may be fixed to the retaining ring 108 for the reception of suitable hoisting cables (not shown). As a consequence, if desired the drain 100 may be removed from the upper inlet opening of the catalytic reactor in which it is positioned if it is so desired.

However, the modified drain 100 is of a construction such that it may be removed through the lower outlet opening of a catalytic reactor. This is accomplished by removing the bolts 146 from the support plates 142; whereby such support plates may be removed from the bottom of the conduit 24'. As a consequence, and assuming that the latching rod 160 has been withdrawn, the drain 100 may be lowered from the catalytic reactor through the conduit 24'.

When a catalytic treating reaction is in progress finely divided catalysts will be deposited in the drain port 132 and also about the outer screen member 118 in the catalyst chamber 14'. Catalytically treated fluent materials will flow through the inner and outer screen members 118 and 122 into the drainage space 130 and from thence through the reactants withdrawal line 32'. A minor portion of the fluent materials will flow into the drain port 132 and then to the withdrawal line 32' through the perforations 104 in the sleeve 102. Again, the pressure drop within the catalyst chamber 14' will be cancelled out due to the presence of catalysts and fluent reactants on both sides of the drain space 130.

What is claimed is:

1. A reactor for treating a fluent material with a finely divided solid comprising a vessel having walls defining a chamber wherein said fluent material and said solid may be brought into contact with each other, said chamber having an upper inlet opening and a lower outlet opening; said lower outlet opening having a diameter less than the maximum diameter of said chamber, a solids-supporting drain nested at the bottom thereof in said outlet opening and extending upwardly into said chamber, said drain comprising upstanding concentrically spaced wall members defining an annular drainage space and a drain port, said drain port being open to said chamber for the admission of a portion of said finely divided solid, a ring-shaped cover plate closing said drainage space at the top thereof, a solids supporting drain port door hinged to the bottom of said drain; and latching means extending through said wall into latching engagement with said drain port door for releasably closing the same, at least one of said wall members being perforated.

2. A reactor for treating a fluent material with a finely divided solid comprising a vessel having walls defining a chamber wherein said fluent material and said solid may be brought into contact with each other, said chamber having an upper inlet opening and a lower outlet opening; said lower outlet opening having a diameter less than the maximum diameter of said chamber, a solids-supporting drain nested in said outlet opening and extending upwardly into said chamber, said drain comprising an upstanding open-ended cylindrical sleeve, a screen concentric with and spaced from said sleeve, whereby said sleeve and said drain define an annular drainage space and a drain port, said drain port being open to said chamber for the admission of a portion of said finely divided solid, a closure member fixed to the upper end of said sleeve for closing said drainage space at the upper end thereof and a solids supporting releasable closure plate hinged to the bottom of said drain for normally closing said drain port.

3. A reactor for treating a fluent material with a finely divided solid comprising a vessel having walls defining a chamber wherein said fluent material and said solid may be brought into contact with each other, said chamber having an upper inlet opening and a lower outlet opening, said lower outlet opening having a diameter less than the maximum diameter of said chamber; a solids supporting drain having a cross-sectional configuration corresponding to and slightly less than the cross-sectional configuration of said upper opening nested in said lower outlet opening and extending upwardly into said chamber, said drain comprising an upstanding open-ended cylindrical sleeve defining a drain port, said drain port being open to said chamber for the admission of a portion of said finely divided solid, a screen surrounding said sleeve and spaced therefrom to define a drainage space therebetween, a closure member fixed to the top of said sleeve for closing said drainage space, a solids supporting drain port door hinged to the bottom of said drain and latching means extending through said wall into latching engagement with said drain port door for releasably closing the same.

4. A reactor for treating a fluent material with a finely divided solid comprising a vessel having walls defining a chamber wherein said fluent material and said solid may be brought into contact with each other, said chamber having an upper inlet opening and a lower outlet opening, said lower outlet opening having a diameter less than the maximum diameter of said chamber; a solids support-drain having a cross-sectional configuration corresponding to and slightly less than the cross-sectional configuration of said upper opening nested in said lower outlet opening and extending upwardly into said chamber; said drain comprising an upstanding open-ended cylindrical sleeve, a plurality of radially outwardly extending supporting ribs fixed to the outer surface of said sleeve; openwork screen support means fixed to the outer sides of said supporting ribs and a screen member secured to said openwork screen supporting means, whereby a drainage space is provided intermediate said sleeve and said screen supporting means and whereby a drain port is defined by said sleeve, a perforate solids supporting drain port door hinged to the bottom of said sleeve; said drainage space being open to said chamber for the admission of a portion of said finely divided solid latching means extending through the wall of said outlet opening into latching engagement with said drain port door for releasably closing the same; and a hoisting cable fixed at one end to the top of said drain and at the other end to said wall of said vessel adjacent said upper inlet opening.

5. A reactor for treating a fluent material with a finely divided solid comprising a vessel having walls defining a chamber wherein said fluent material and said solid may be brought into contact, said chamber having an upper inlet opening and a lower necked outlet opening, a solids supporting drain nested in the neck of said lower outlet opening and extending upwardly into said chamber; said drain comprising a perforate cylindrical sleeve having a diameter less than the diameter of said neck, a plurality of supporting ribs fixed to the top of said sleeve and extending upwardly therefrom into said catalyst chamber, a cover ring fixed to the tops of said support ribs, inner and outer screen members fixed to the inner and outer sides, respectively, of said support ribs, whereby said sleeve member and said screen members define a drain port and whereby said inner and outer screen members define a drainage space therebetween, a drain port door mounted on the bottom of said sleeve; support means releasably fixed to the side of said neck and engageable with the bottom of said drain for supporting the same in said lower opening, and latching means extending through the wall of said neck into engagement with said drain port door for supporting the same in a closed position.

References Cited in the file of this patent

UNITED STATES PATENTS

| | | |
|---|---|---|
| 900,104 | Kessler | Oct. 6, 1908 |
| 1,081,515 | Reinohl | Dec. 16, 1913 |
| 1,855,904 | Brown et al. | Apr. 26, 1932 |
| 2,346,018 | Fulton | Apr. 4, 1944 |
| 2,483,948 | Underwood | Oct. 4, 1949 |